Sept. 11, 1928.
W. K. TAVENDER
ELECTRICAL HEATER
Filed Jan. 18, 1927
1,683,740
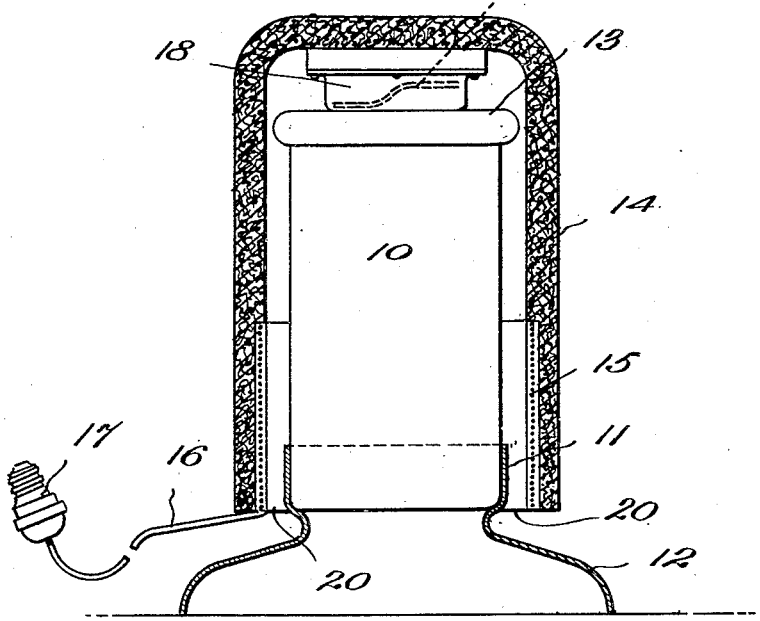
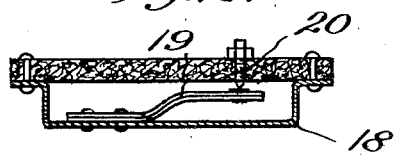
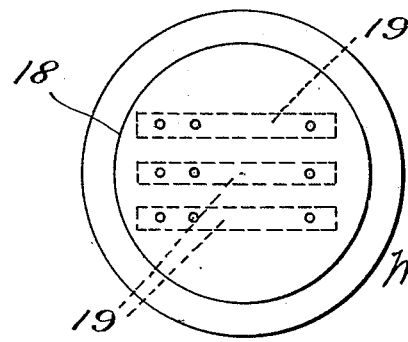

Patented Sept. 11, 1928.

1,683,740

UNITED STATES PATENT OFFICE.

WALTER K. TAVENDER, OF HAWORTH, NEW JERSEY, ASSIGNOR TO IDALE HADLEY.

ELECTRICAL HEATER.

Application filed January 18, 1927. Serial No. 161,735.

My present invention has relation to a convenient and portable form of electrical heater applicable to numerous uses, and more particularly to the heating of liquids such as milk for the feeding of infants.

In the heating of liquids within a container of any kind, it is well known that heat should be applied at or near the bottom of the container, since the convective currents which are set up within the body of liquid by the heating thereof cause a circulation of liquid which automatically transfers the heat from the bottom to the top of the receptacle or container. It also follows from this that the highest temperature will always be found at the top of a body of liquid in process of heating.

In the heating of milk for infants it is important that the temperature of the milk should not be carried beyond a definite maximum, both on account of the danger of burning the child who is fed and because of the undesirable changes in the constitution of the milk caused by overheating.

It is desirable, therefore, that any heating device for milk should be provided with automatic means for preventing overheating, and for this purpose it has been proposed hitherto to employ an automatic thermostat in combination with electrical heating coils with the end in view of interrupting the heating current before an unduly high temperature is reached.

The present invention has relation to a special arrangement of this general nature, whereby the thermostat is affected as little as possible by the direct action of the heating coils, and its operation is made to depend pricipally upon the temperature of the liquid at the top of the mass. In this manner the hottest portion of the liquid mass becomes the sole governor of the action of the thermostat, and, therefore, no portion of the mass of liquid is permitted to exceed the desired maximum of temperature.

Other objects and advantages of the invention will be clear from the following description.

The invention is illustrated in a preferred form in the accompanying drawings, wherein Figure 1 is a central vertical sectional view of my heater as applied to a heating bottle for infants, Figure 2 is a similar view on a larger scale of the thermostat and its enclosing casing, and Figure 3 is a plan view seen from beneath of the parts shown in Figure 2.

The feeding bottle, from which the usual nipple cap has been removed is shown at 10, and is preferably supported by inserting the bottom thereof into the upturned open neck 11 of a hollow metal base 12.

After the bottle 10 has been suitably filled with milk or other liquid, it is prepared for heating by applying to the top thereof an elastic rubber cap 13 which embraces the beaded top of the bottle 10 in a well known manner so as to be securely fixed in place.

When the bottle is thus prepared and placed the heating device proper is placed over it in the manner shown in Figure 1. This device preferably comprises an inverted cup shaped heat insulating outer casing 14 which may be made of wool, asbestos or other heat insulator.

In the lower part of the insulating casing 14 there are embedded the usual heat producing resistance wires 15 to which electric current is conducted through the cable 16, the same being furnished with any well known form of plug 17 for insertion in the ordinary socket.

It is a peculiarity of the present invention that the group of wires 15 occupies only the lower part of the heater, thus applying heat to the bottle 10 exclusively near the bottom thereof.

At the top of the heater 14 and within the same is located a metal shell 18 preferably cylindrical in shape within which is placed the thermostatic device whereby the heating current is interrupted when the maximum temperature is reached.

This thermostatic device preferably comprises a plurality of bi-metallic elements 19 of a well known nature making normal contact with adjustable screw threaded contact devices 20, each connected with a separate section of the group of heating wires 15. In this manner the total current employed for heating the bottle is divided into parts appropriate to operation of the individual bi-metallic thermostats. The contacts 20 can be screwed up and down so as to adjust the position of open circuit in a manner to control the operation of the thermostat.

The shell 18 which contains the thermostats 19 rests upon and is supported by the rubber cover 13, and the dimensions of the outer casing 14 are such that a free annular space 20 is left around the neck 11 for free circulation of air.

Various changes can be made in the construction of my apparatus without departing from the scope of my invention and I do not limit myself to the details herein shown and described.

What I claim is—

1. Means for safely heating a liquid comprising a container for the liquid, a cover thereon, a heater having a casing fitting loosely over said container and having electrical heating coils, and a thermostatic governor within said casing in circuit with said coils adapted to rest upon the cover of the container to support the heater.

2. In a heater for liquids, a cup shaped insulating casing, a heating coil therein, a hollow shell within the casing at the top thereof and a thermostat in said shell in circuit with said heating coil.

3. Apparatus as in claim 2 wherein the heating coil is divided into sections and wherein the thermostatic device comprises a separate bi-metallic member in series with each of said sections.

In testimony whereof I have hereto affixed my signature on this 14th day of January 1927.

WALTER K. TAVENDER.